Figure 1:
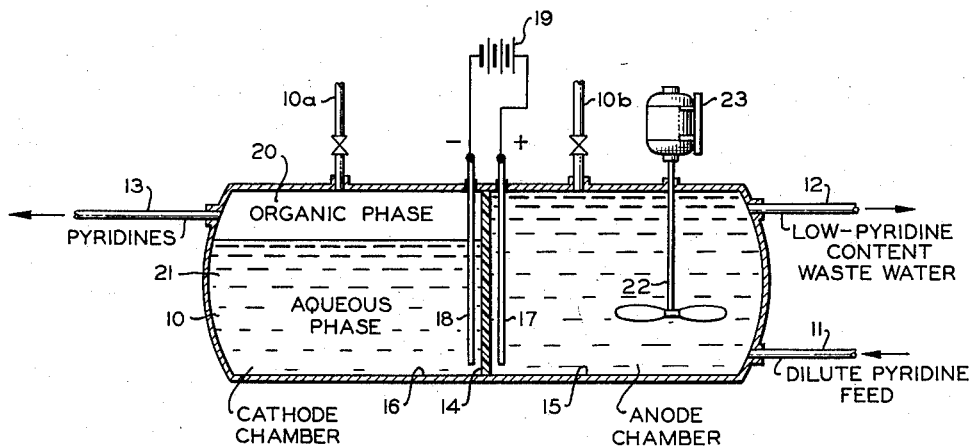

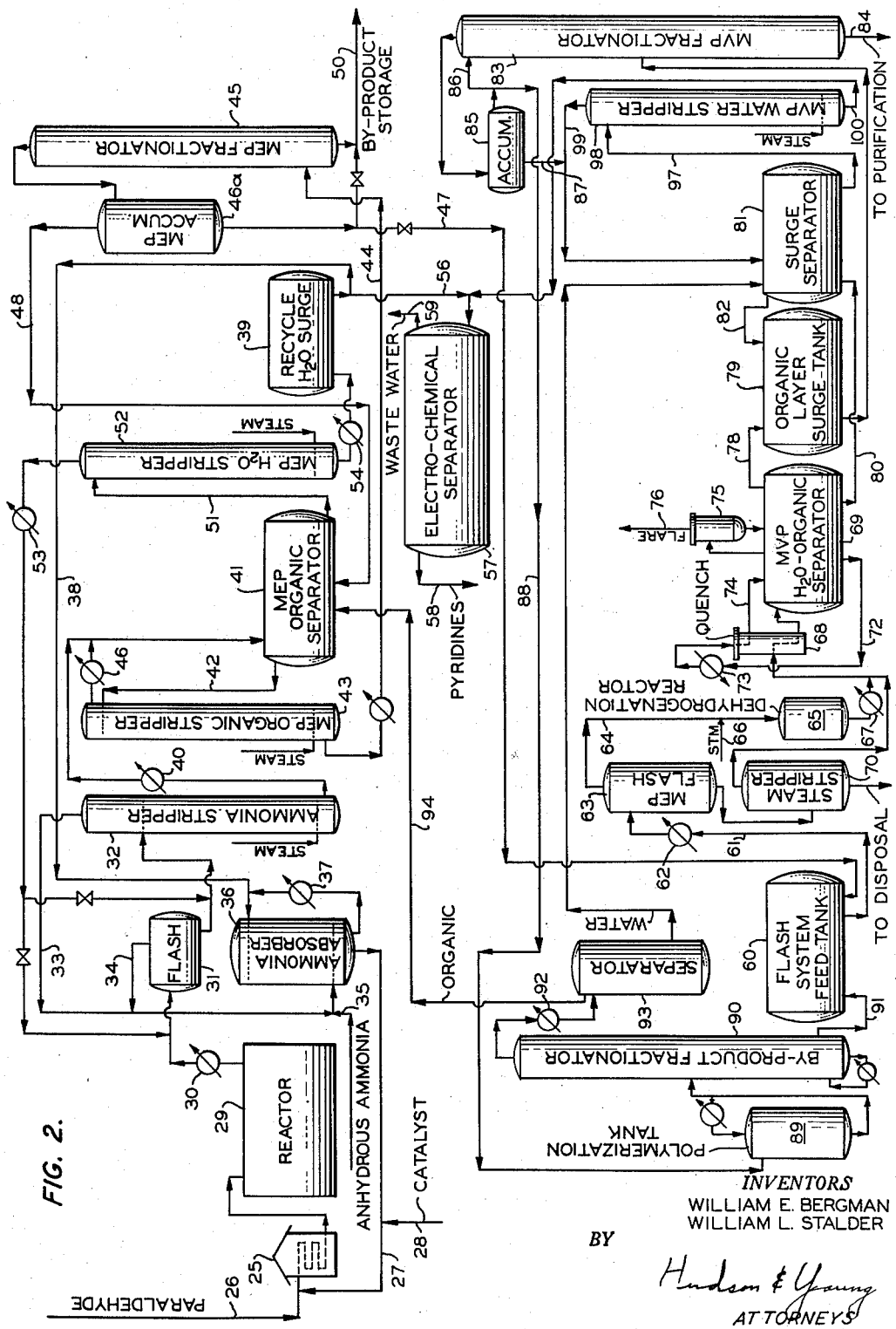

United States Patent Office 2,849,358
Patented Aug. 26, 1958

2,849,358

METHOD OF RECOVERING HETEROCYCLIC NITROGEN BASES FROM AQUEOUS SOLUTIONS

William E. Bergman and William L. Stalder, Bartlesville, Okla., assignors to Phillips Petroleum Company, a corporation of Delaware Application October 11, 1954, Serial No. 461,418

1 Claim. (Cl. 204—180)

This invention relates to a method of recovering ionizable heterocyclic nitrogen bases from aqueous solutions thereof.

In the manufacture of heterocyclic nitrogen chemicals, particularly substituted pyridines, many of the reactions involved are conducted in the presence of large quantities of water or steam, and the products must, therefore, be separated from large quantities of water.

In particular, in the commercial manufacture of vinyl pyridines, such as 2-methyl-5-vinylpyridine, paraldehyde and aqueous ammonia are condensed in the presence of a catalyst to form 2-methyl-5-ethylpyridine and the latter compound is dehydrogenated to form 2-methyl-5-vinylpyridine. In the condensation reaction, water is present in the aqueous ammonia solution and, in addition, steam is utilized in stripping ammonia from the condensed product. Accordingly, the 2-methyl-5-ethylpyridine must be separated from a large amount of water to obtain the starting material for the dehydrogenation step, and for fractionation thereof to separate out heterocyclic nitrogen compounds, such as picolines, from the de-hydrogenation feed. Moreover, the dehydrogenation step itself is advantageously carried out in the presence of large quantities of steam, thus necessitating separation of the product, 2-methyl-5-vinylpyridine, from large quantities of water.

This invention resides in the combination of (a) a phase separation step producing an organic phase containing the bulk of the pyridine compound and an aqueous phase containing much smaller amounts of the pyridine compound followed by (b) a countercurrent stripping step wherein further quantities of pyridines are removed from the water phase of the phase separation step and, finally, (c) a step wherein the residual pyridine materials are separated from the stripped aqueous phase by contacting such stripped phase with a permeable membrane, and causing a current to flow through this membrane in such fashion that the pyridine compounds to be recovered selectively pass through the membrane. Surprisingly, even though the concentration of pyridine compounds in the stripped aqueous solution is very low, they can be efficiently and economically recovered by selective migration through the membrane.

The described combination of steps can be advantageously employed both in the separation of the condensed 2-methyl-5-ethylpyridine from its aqueous solution, and also in the separation of 2-methyl-5-vinylpyridine from water following the dehydrogenation step. In either event, a substantially complete recovery of the valuable pyridine compounds is obtained by utilizing the three step process noted above.

Moreover, the electrochemical step involving migration of the pyridine compounds through a permeable membrane can be advantageously used by itself where very small quantities of pyridine compounds are present in an aqueous solution. We have further discovered that the efficiency of the electrochemical step can be improved by agitating the material introduced into contact with the membrane, and by introducing a polymerization inhibitor into the material which diffuses through the membrane to prevent polymerization of the pyridine materials.

Accordingly, it is an object of the invention to provide an improved and economical method of recovering heterocyclic nitrogen bases from their aqueous solutions.

It is a further object to effect substantially complete recovery of the heterocyclic nitrogen materials in such operations.

Various other objects, advantages and features of the invention will become apparent from the following detailed description taken in conjunction with the accompanying drawings, in which:

Figure 1 is a vertical sectional view of a vessel in which the electrochemical separation step is carried out; and Figure 2 is a flow diagram of a plant for producing 2-methyl-5-vinylpyridine from ammonia and paraldehyde utilizing the novel separation process of the invention.

Referring now to Figure 1, we have shown an electrochemical separation vessel 10 to which an aqueous solution containing residual amounts of a heterocyclic nitrogen base is introduced through a conduit 11, water substantially denuded of heterocyclic nitrogen bases is recovered through a conduit 12, and the heterocyclic nitrogen bases are recovered through a line 13.

In accordance with the invention, a permeable membrane 14 is disposed transversely within the vessel and divides it into an anode chamber 15 and a cathode chamber 16. Preferably and advantageously, the membrane 14 is permeable to cations and substantially impermeable to anions. Suitable membranes of this type are particles of an insoluble, infusible cation-exchange resin intimately and uniformly dispersed through a matrix of polymeric material, such as polyethylene, polyisobutylene, vulcanized natural and synthetic rubber, polyvinyl chloride and copolymers of vinyl chloride and vinyl esters of lower aliphatic acids. The resins can be sulfonated phenol-aldehyde products, sulfonated cross-linked polymers of styrene, or carboxylic resins. Such a permeable membrane is disclosed, for example, in Canadian Patent 493,562, dated June 9, 1953. Other suitable membranes of this type are disclosed in U. S. Patent 2,636,851, dated April 28, 1953.

An anode 17 is disposed in the compartment 15 and a cathode 18 is disposed in the compartment 16, a current being applied to these electrodes by a battery 19 in such fashion that the anode 17 is positive and the cathode 18 is negative. Suitable materials for the electrodes are inert metals, such as platinum, lead, iron, or mercury, or either of the electrodes can be formed from carbon.

The voltage is regulated to provide a current density at the electrodes within the range of 0.1 to 1.0 ampere per square inch, with values in the lower part of this range being preferred, inasmuch as higher values of current density tend to increase the temperature, and thus promote polymerization of the heterocyclic nitrogen bases where they contain a vinyl or alpha methylvinyl group.

As a result of the described connection of the battery 19, current passes from the anode 17 through the aqueous solution of heterocyclic nitrogen base in compartment 15, thence through the membrane 14, and the conductive aqueous liquid in compartment 16 to the cathode 18. As a result, the ions of the heterocyclic nitrogen base pass selectively through the membrane 14 and, where the organic material is present in an amount greater than can be dissolved in the conductive aqueous liquid, it appears as an organic phase 20 separated from a phase 21 of conductive aqueous liquid. The organic phase 20 is recovered, as previously noted, through line 13 or, if no separate organic phase is formed, the base is separated, as by extraction, from the conductive liquid. Gases evolved as a result of the electrochemical action are withdrawn through valved vent pipes 10a and 10b.

Where the heterocyclic nitrogen base contains a vinyl or alpha methylvinyl group, we have found that polymerization can be avoided by adding an inhibitor to the material in compartment 16. Suitable materials for this purpose are tertiary-butyl catechol, sodium polysulfide, sulfur, and the like in the amount of 0.01 to 5.0% by weight.

The aforesaid selective migration of the heterocyclic nitrogen bases through the membrane 14 is promoted where the anode chamber 15 incorporates a stirring device 22 driven by a motor 23. Such a stirring device cannot be used in the compartment 16, as it would interfere with the formation of separate organic and aqueous phases therein. When operating within the defined range of current density, the average holdup time of the material in the vessel varies, of course, with the concentration of heterocyclic nitrogen bases in the water stream, and with the desired efficiency of separation. Practically quantitative removal of the heterocyclic nitrogen bases can ordinarily be obtained with a residence time in the chamber of one to seven hours.

In one commercial operation, the aqueous solution fed to the vessel contains 0.112% by weight of 2-methyl-5-ethylpyridine and 0.006% of picolines. These organic materials can be readily removed practically quantitively from the aqueous solution. Another stream from which residual amounts of pyridine compounds are recovered contains 0.01% by weight of picolines, 0.04% 2-methyl-5-ethylpyridine, 0.003% 2-methyl-5-vinylpyridine, 0.004% dimethylpyridines, and 0.005% 3-vinylpyridine with a total flow of 95,000 pounds per day of the first stream and 56,000 pounds per day of the second stream. In general, in the commercial operations hereinbefore noted, the composite stream passed to the electrochemical separation step contains 0.01 to 0.5% 2-methyl-5-ethylpyridine and 0 to 0.1% 2-methyl-5-vinylpyridine together with trace quantities of picolines, lutidines and vinylpyridines.

Although, as stated, particularly valuable results are obtained on a commercial scale with the pyridine compounds hereinbefore discussed, the electrochemical separation step of the invention is applicable generally to ionizable heterocyclic nitrogen bases in aqueous solutions containing 1% or less of the heterocyclic base where conventional separation steps are considerably less effective than the practice of the method of this invention. Such ionizable heterocyclic nitrogen bases include various substituted pyridines, such as 2-ethyl-5-vinylpyridine, picolines, such as 2-methylpyridine, lutidines, such as 2-5-dimethylpyridine, 3-ethylpyridine, 3-vinylpyridine, mono or poly alkyl substituted pyridines containing up to twelve carbon atoms, piperidines, and other hydropyridines, pyrroles, such as 2-4-dimethyl-3-ethylpyrrole, pyrrolidines, pyrrolidones, quinolines and alkyl substituted quinolines.

Although, as will be evident from the foregoing discussion, the electrochemical separation step has important advantages and uses as a single step recovery operation, excellent results are obtained in the separation of 2-methyl-5-ethylpyridine and 2-methyl-5-vinylpyridine from large quantities of water by a three step process involving phase separation, stripping, and the described electrochemical separation step.

This three stage separation step is illustrated in connection with a simplified flow diagram, Figure 2, of a plant for producing 2-methyl-5-vinylpyridine from ammonia and paraldehyde. Referring now to this figure, paraldehyde, aqueous ammonia and a catalyst, such as ammonium bifluoride, are charged to a preheater furnace 25 through lines 26, 27 and 28, respectively. The material from the preheater furnace 25 passes to a reactor 29 wherein 2-methyl-5-ethylpyridine is formed, the effluent passing through a cooler 30 and a flash tank 31 to an ammonia stripper 32. Ammonia stripped from the effluent passes from stripper 32 by a line 33 which is joined by an overhead line 34 from flash tank 31, the combined stream being admixed with makeup anhydrous ammonia from a line 35 and passing to an ammonia absorber 36 provided with a cooler 37 to remove the heat of absorption. In absorber 36, the ammonia is made up to the proper strength aqueous solution by water passing through a line 38 from a surge tank 39. As will become apparent hereafter, this recycle water contains residual quantities of heterocyclic nitrogen compounds, and the use of this water in the absorber 36 reduces the load upon the electrochemical separator hereinafter described.

The stripped 2-methyl-5-ethylpyridine effluent passes from the bottom of column 32 through a condenser 40 to a phase separation vessel 41. Here, a primary separation of the material is made into an upper or organic phase containing most of the 2-methyl-5-ethylpyridine together with some additional heterocyclic nitrogen compounds together with a water phase containing a small amount of 2-methyl-5-ethylpyridine and other heterocyclic nitrogen bases.

The organic phase is recovered through a line 42 which leads to a stripping column 43 wherein the organic phase is countercurrently stripped with steam, the stripped material passing through a line 44 to a fractionator 45. The stripping steam together with the stripped organics pass through a condenser 46 back to the phase separator 41. From the fractionator 45, the 2-methyl-5-ethylpyridine passes through an accumulator 46a and a line 47 to a dehydrogenation step hereinafter described, while light materials removed from the accumulator pass through line 48 to the phase separator 41. The heterocyclic nitrogen compounds other than 2-methyl-5-ethylpyridine are passed through a line 50 to storage.

It will be noted that a primary separation is made in unit 41 between (1) the 2-methyl-5-ethylpyridine and other heterocyclic compounds and (2) the water added to the process in the ammonia solution, and in the columns 32, 43. In accordance with the invention, a further separation is made by passing the aqueous phase from separator 41 through a line 51 to a stripping column 52 wherein the aqueous phase is countercurrently contacted with steam to remove additional quantities of 2-methyl-5-ethylpyridine and other heterocyclic compounds, which pass overhead through a cooler 53 to the flash tank 31 or column 32 for recovery. The stripped aqueous phase passes through a bottoms cooler 54 to the surge tank 39, this material containing residual amounts of 2-methyl-5-ethylpyridine and other heterocyclic nitrogen bases, a part of which are recovered by virtue of being present in the water fed through line 38 to the absorber 36.

The remainder of the stripped aqueous phase is fed through a line 56 to an electrochemical separator unit 57 which is similar in construction and operation to the separator of Figure 1. Hence, the residual 2-methyl-5-ethylpyridine and heterocyclic nitrogen bases are efficiently recovered through a line 58 while water substantially denuded of organic material is recovered through line 59. It will be apparent that a very complete and efficient recovery of the 2-methyl-5-ethylpyridine and other organic material is made by the described three step operation including the separator 41, the stripper 52 and the separator 57.

As previously noted, the 2-methyl-5-ethylpyridine from the condensation step passes through line 47 to a feed tank 60. Material leaving the flash tank passes through a line 61 and a heater 62 to a flash tank 63 wherein the bulk of the 2-methyl-5-ethylpyridine passes overhead through a line 64 to a dehydrogenation reactor 65. Prior to the dehydrogenation step, the material in line 64 is mixed with a large quantity of steam which is introduced through a line 66. The dehydrogenated material, 2-methyl-5-vinylpyridine, passes through a waste heat boiler 67 and a quench tower 68 to a phase separator vessel 69. The material not flashed overhead in tank 63 passes through a steam stripper 70, the heavy bottoms being discarded and the overhead material joining the dehydrogenation effluent and passing through the quench tower 68 to the phase separator vessel 69. The circulation of quenching material through tower 68 can be traced through a line 72, a cooler 73, and a line 74, while gaseous materials are separated from the tank 69 and passed through a recovery unit 75 to a flare 76.

In the separator 69, an upper organic layer containing principally 2-methyl-5-vinylpyridine is formed which passes through a line 78 to a surge tank 79. A lower aqueous layer is formed in separator 69 which passes through a line 80 to a second phase separation tank 81.

A phase separation also takes place in separator tank 81, the organic layer containing relatively large quantities of 2-methyl-5-vinylpyridine passing through line 82 to the surge tank 79 where it is combined with the organic layer from separator 69 and passed to a fractionator 83. 2-methyl-5-vinylpyridine is recovered as a bottoms product and passes through line 84 to subsequent purification and storage steps while unreacted 2-methyl-5-ethylpyridine and other heterocyclic nitrogen bases pass overhead to an accumulator 85.

A portion of the material from the accumulator 85 is returned through line 86 as reflux, and another portion is passed through line 87 to the separator tank 81. The remainder of the material from accumulator 85 passes through a line 88 to a tank 89, where polymers are dropped out, and thence, to a fractionator 90. The bottoms product of fractionator 90, consisting primarily of 2-methyl-5-ethylpyridine, passes to the feed tank 60 by a line 91 while the overhead product, containing materials such as picolines and lutidines, passes through a condenser 92 to a phase separator 93. Water and organic layers separate out in the unit 93, the organic layer passing through a line 94 to the separator 41, where the picolines and lutidines pass through the stripping system and are recovered as by-products at fractionator 45. The aqueous phase from unit 93 passes through a line 96 to the phase separator vessel 81.

It will be evident that, in the phase separator 81, a primary separation is made between (1) 2-methyl-5-vinylpyridine and other heterocyclic nitrogen compounds which are concentrated in the organic phase and are recovered through line 82 and (2) an aqueous phase denuded in 2-methyl-5-vinylpyridine and heterocyclic nitrogen bases.

In accordance with the invention, the water phase is withdrawn through a line 97 and passed to a steam stripping column 98. The 2-methyl-5-vinylpyridine and other heterocyclic nitrogen bases stripped from the aqueous phase pass overhead through the line 99 and are returned to separation vessel 81 for the recovery of the 2-methyl-5-vinylpyridine and other heterocyclic nitrogen bases.

The stripped aqueous phase leaving the bottom of column 98 passes through a line 100 to the electrochemical separator 57 where the residual amounts of 2-methyl-5-vinylpyridine and other heterocyclic nitrogen bases are recovered in the manner described in connection with Figure 1.

It will be apparent, therefore, that we have described a system for producing 2-methyl-5-vinylpyridine from paraldehyde and ammonia wherein the pyridine materials are substantially quantitatively separated from the condensation product of the paraldehyde and ammonia by a three step process involving phase separation in vessel 41, stripping in column 52 and electrochemical separation in unit 57. Moreover, in the subsequent steam dehydrogenation of the 2-methyl-5-ethylpyridine, the product is separated from large quantities of water by an efficient three step process involving phase separation in unit 81, stripping in column 98 and electrochemical separation in unit 57. In this manner, any wasting of the valuable pyridine chemicals is prevented, and efficient commercial operation is obtained.

While the invention has been described in connection with present, preferred embodiments thereof, it is to be understood that this description is illustrative only and is not intended to limit the invention.

We claim:

The method of recovering pyridines from a dilute aqueous solution thereof which comprises passing an aqueous solution containing 0.01 to 0.5% 2-methyl-5-ethylpyridine and 0 to 0.1% 2-methyl-5-vinylpyridine together with trace quantities of picolines into contact with one side of a membrane permeable to cations and substantially impermeable to anions, and also into contact with an anode positioned adjacent said membrane, maintaining an aqueous phase saturated with said pyridines and picolines in contact with the other side of said membrane and with a cathode, agitating the aqueous solution on the anode side of the membrane but not the aqueous phase on the cathode side of the membrane, passing an electric current between said anode and said cathode at such rate as to cause said 2-methyl-5-ethylpyridine, 2-methyl-5-vinylpyridine and picolines to be selectively transmitted through said membrane and form an organic phase superimposed on said aqueous phase due to the saturation of said aqueous phase with said pyridines and picolines, adding an effective quantity of a polymerization inhibitor selected from the group consisting of tertiary-butyl catechol, sodium polysulfide and sulfur to said aqueous phase as the separation proceeds, and separately recovering said aqueous and organic phases.

References Cited in the file of this patent

UNITED STATES PATENTS

| | | |
|---|---|---|
| 2,219,209 | Neufeld | Oct. 22, 1940 |
| 2,350,447 | Cole et al. | June 6, 1944 |
| 2,437,649 | Milner | Mar. 9, 1948 |
| 2,636,851 | Juda et al. | Apr. 28, 1953 |

OTHER REFERENCES

"Amberplex Ion Permeable Membranes," Rohm & Haas Co. (1952), pages 7, 8 and 9.

Lightfoot: "Industrial and Eng. Chem.," August 1954, vol. 46, No. 8, page 1582.